United States Patent [19]

Dawson

[11] Patent Number: 4,496,113
[45] Date of Patent: Jan. 29, 1985

[54] INTEGRATED PROCESS FOR PREPARING A CONTINUOUS STRING OF MOLDED ARTICLES WOUND IN A COIL

[75] Inventor: C. Bruce Dawson, Winchester, Va.

[73] Assignee: O'Sullivan Corporation, Winchester, Va.

[21] Appl. No.: 481,825

[22] Filed: Apr. 4, 1983

Related U.S. Application Data

[63] Continuation-in-part of Ser. No. 316,033, Oct. 28, 1981, Pat. No. 4,445,836.

[51] Int. Cl.³ .............................................. B65H 17/02
[52] U.S. Cl. ............................... 242/67.1 R; 242/75.3
[58] Field of Search ................. 242/67.1 R, 75, 75.3, 242/75.51, 57, 67.2; 226/113, 114

[56] References Cited

U.S. PATENT DOCUMENTS

| | | |
|---|---|---|
| 1,400,827 | 12/1921 | Leumann ............................ 242/75.3 |
| 1,706,164 | 3/1929 | Hull ................................ 242/75.51 |
| 2,569,083 | 9/1981 | Wilhelm . |
| 2,597,133 | 5/1952 | Snyder ............................. 242/75.51 |
| 2,714,266 | 8/1955 | Battey ............................... 242/75.3 |
| 3,192,298 | 6/1965 | Fisher . |
| 3,405,857 | 10/1968 | Albrecht ........................ 242/75.3 X |
| 3,655,308 | 4/1972 | Kutik et al. . |
| 3,684,205 | 8/1972 | Rogow .......................... 242/75.3 X |
| 4,008,302 | 2/1977 | Erlichman . |

Primary Examiner—Stuart S. Levy
Assistant Examiner—Lloyd D. Doigan
Attorney, Agent, or Firm—Burns, Doane, Swecker & Mathis

[57] ABSTRACT

A continuous string of molded items is formed and advanced toward a winder, the latter being periodically rotated. A tensioner member takes-up slack in the advancing string when the winder is stopped. The biasing force applied to the tensioner is reduced during periods when the winder is rotated, in order to reduce the tendency for the string to be excessively stressed.

8 Claims, 8 Drawing Figures

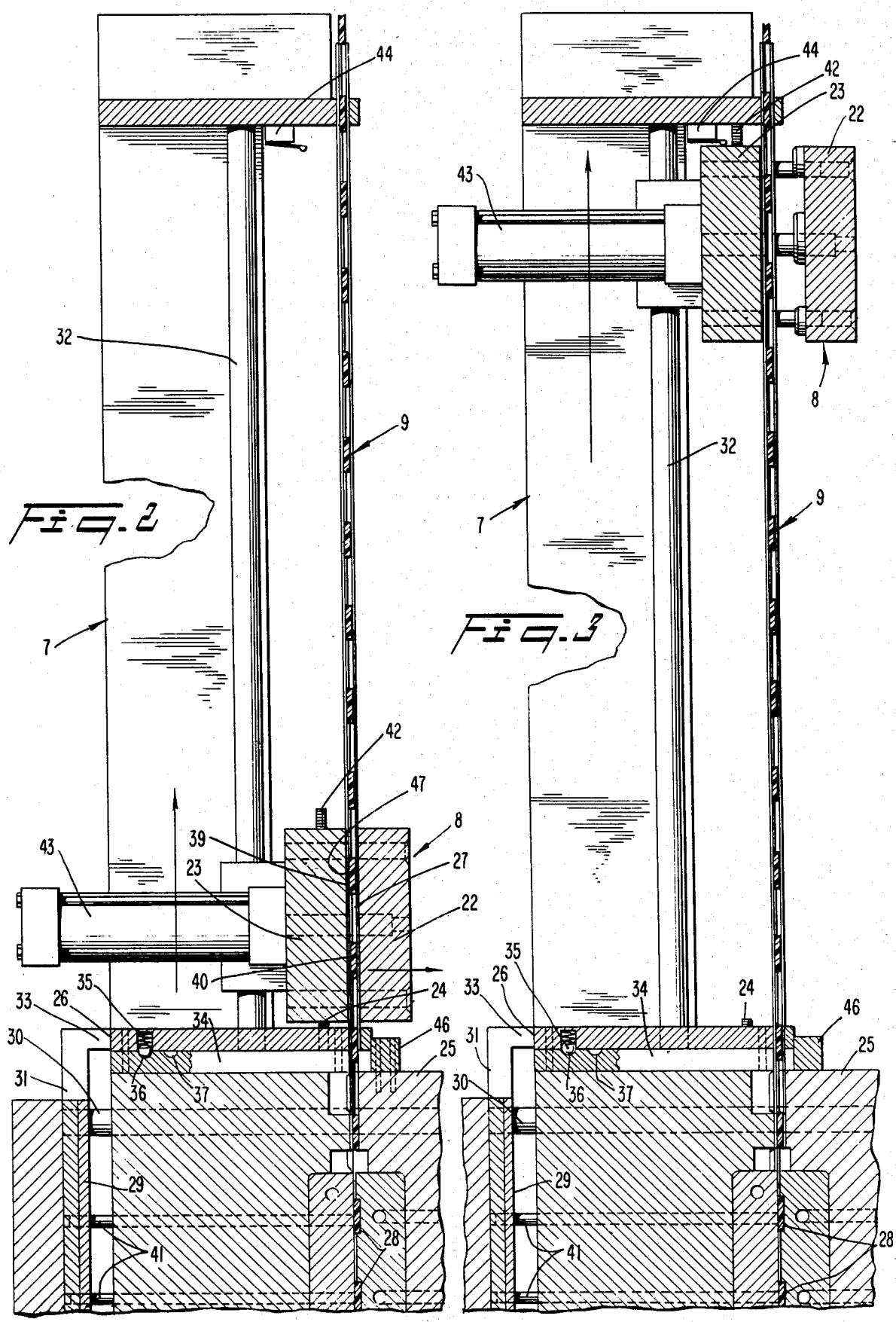

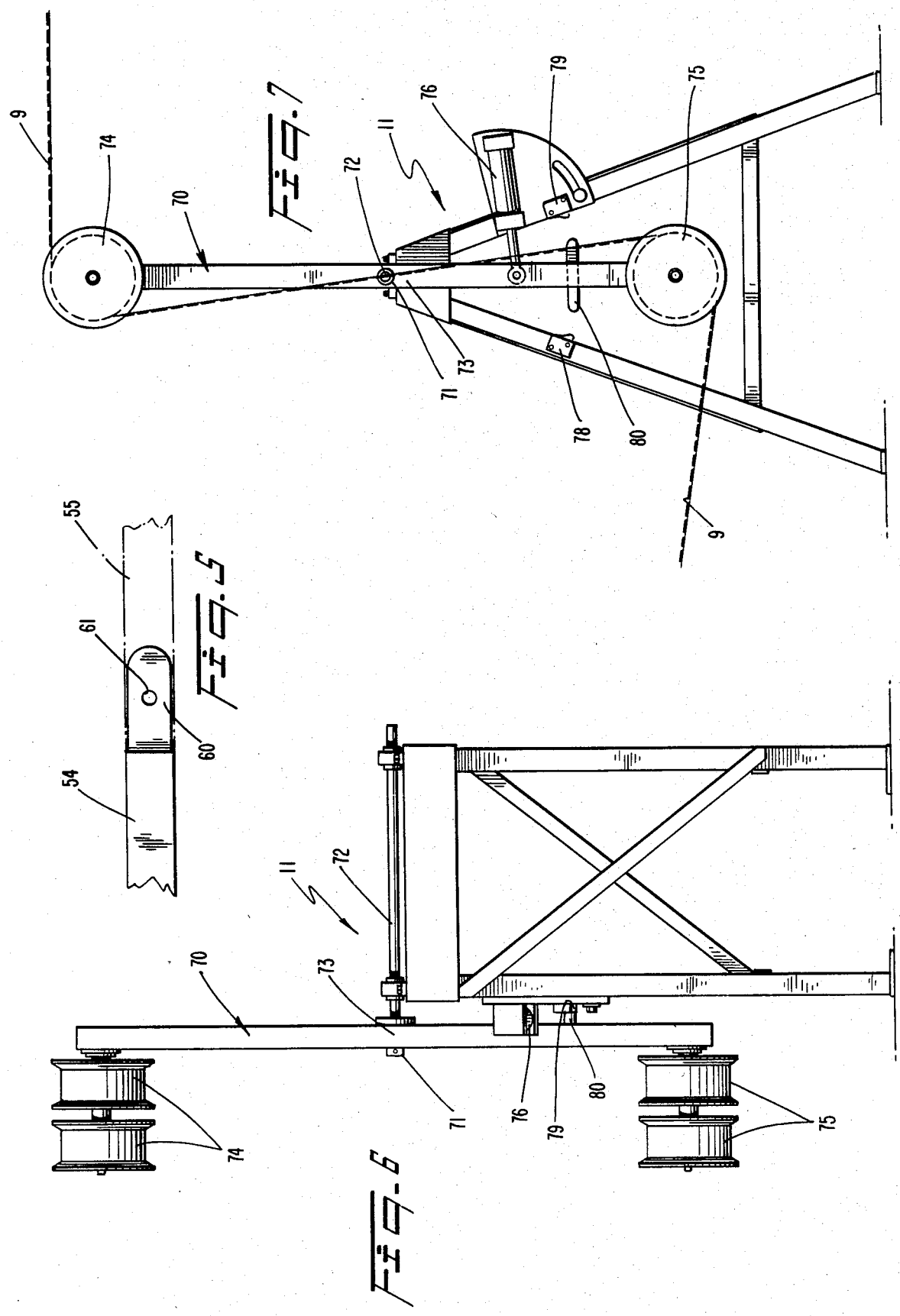

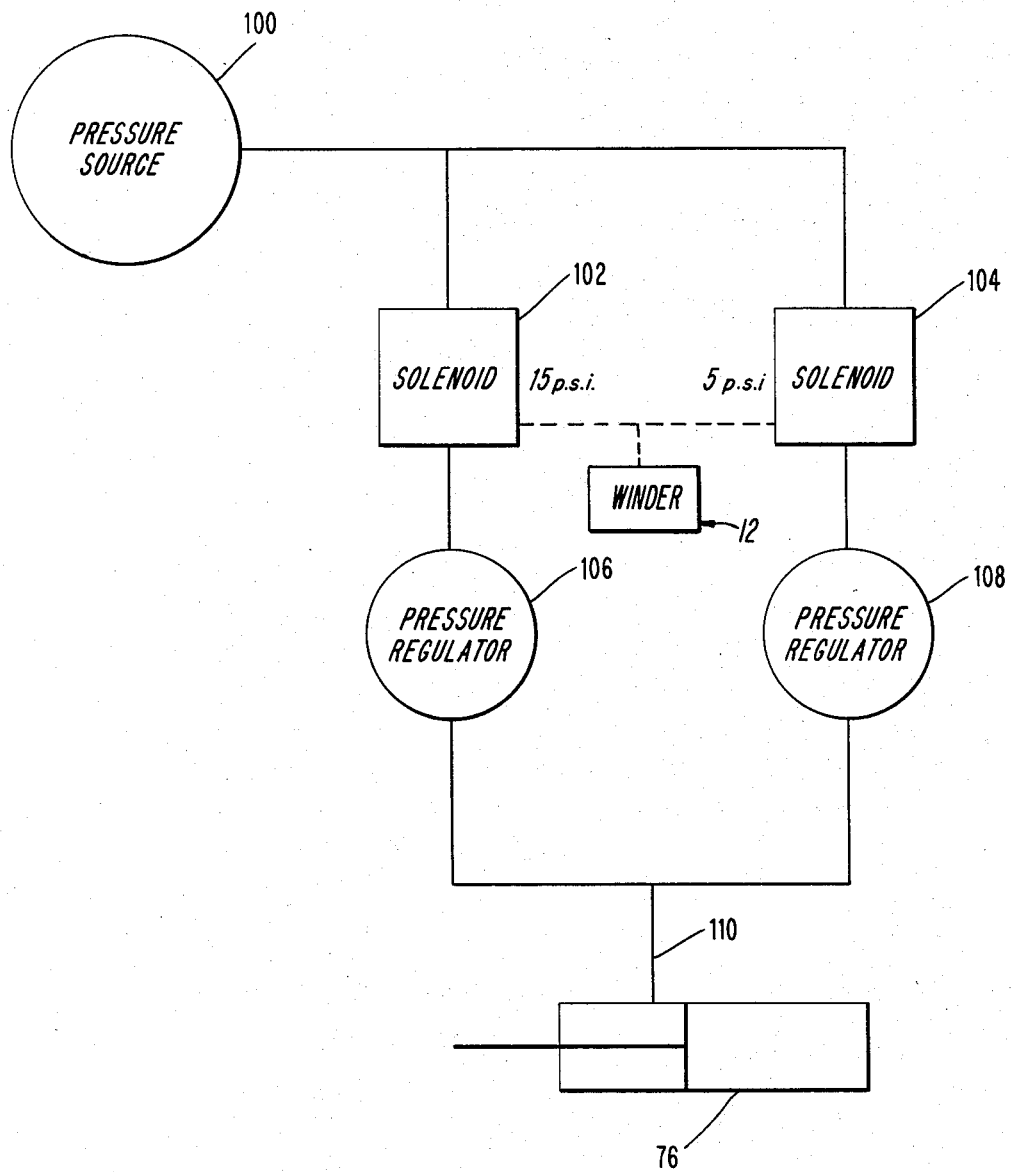

INTEGRATED PROCESS FOR PREPARING A CONTINUOUS STRING OF MOLDED ARTICLES WOUND IN A COIL

This is a continuation-in-part of my copending patent application Ser. No. 06/316,033 filed Oct. 28, 1981, now U.S. Pat. No. 4,445,836 issued May 1, 1984.

BACKGROUND OF THE INVENTION

1. Field of the Invention

The present invention relates to a method and apparatus for practicing the method of molding a continuous string or chain of interconnected elements or articles connected through molded scrap connectors. More particularly, the present invention relates to an integrated and continuous method, and apparatus therefor, of molding and winding a string of molded items into a tight coil.

2. Description of the Prior Art

Automatic assembly techniques for assembling a plurality of different components into a single composite product are well known. These techniques are employed, for example, in the assembly of anti-theft devices, such as those clamped to a garment in a store and which are capable of setting-off an alarm when passed through a suitable sensor, e.g., located at the door of the store.

In the molding of small parts in large quantities for automatic assembly, it is conventional to mold a predetermined number of parts in a single operation of the mold, after which the group of parts may be handled as a unit by virtue of their being connected together through scrap runners. The handling of such units during automatic assembly is, however, generally very inefficient in that it requires at least one person untangling and/or orienting the units and then feeding the individual units to the automatic assembly system. Any means of facilitating the automatic assembly of different parts, e.g., by making the feeding of parts to the assembly system more automatic and trouble free of entanglement and the need for correctly orienting the units, would be of great value to the industry.

In the molding of small parts, the molding of a continuous string of parts in spaced relationship and connected via scrap runners is known.

For example, U.S. Pat. No. 3,192,298 discloses a process for producing a runner of indefinite length with an indefinite number of molded articles secured thereto. In each successive molding operation of the process, the runner and its connected articles are removed from the mold cavity and are advanced so that only a small portion of the runner remains in the mold cavity to be connected to the runner of the next molding. Thereby, a runner of indefinite length is formed.

U.S. Pat. No. 2,569,083 discloses a method for molding a runner simultaneously with a plurality of articles to form a piece comprising the articles in spaced relation with respect to each other but connected through the medium of the runner. Upon removing the molded piece from the mold cavity, the trailing end of the runner is left in the mold cavity so that the leading end of the runner of the newly molded piece is molded around the trailing end of the preceding piece. Thus, a chain of spaced, molded articles is formed.

In both of the afore-discussed processes, however, a great deal of resin is generally employed in the molding of the runner which is of a substantial structure. The runner is no more than a scrap runner, and thus a great deal of resin is wasted in a sense for non-article molding. As well, when the articles are removed from the runner, a great deal of scrap material has to be dealt with. The continuous string of articles provided by the afore-discussed processes are also in a form which would not facilitate easy shipment to an assembler followed by an automatic assembly of parts.

U.S. Pat. No. 3,655,308 also discloses a process for molding a continuous string of items, but with the items being successive sections of a plastic sheet. The sections are joined together at their edges during the molding process, so that the end product is a continuous plastic sheet.

U.S. Pat. No. 4,008,302 discloses a process for the molding of a succession of identical plastic parts in the form of a continuous web in which the parts are spaced from one another and secured to at least one continuous runner. The runner employed in the process can be any tape-like or other scrap portion employed during molding which is not a component of the molded part or parts, and which is provided to the mold from a continuous extraneous source. By employing a flexible web runner, a continuous chain of molded articles or parts formed by the process may then be wound and stored.

The problem with winding a continuous string of molded articles, however, is that the articles often cause problems during the unwinding due to the coil sagging and the string possibly becoming entangled. Thus, while shipment of the wound spool of articles to the assembler is facilitated, the package in itself does not facilitate the automatic assembly of the parts since the wound package must constantly be monitored due to the problems encountered in unwinding from the sagging of the coil of parts and/or entanglement of the parts. The problems encountered often result in stoppages and delays of the assembly line, and can also get so bad as to require that each part be cut from the coil and again be oriented and fed by hand to the assembly machine.

Thus, there is a definite need in the industry for an efficient and effective integrated process for preparing molded parts to be later assembled via automatic assembly in a form which not only facilitates its handling by the supplier, but which also truly facilitates the automatic assembly of the parts once received by the assembler. While of course a package which would facilitate automatic assembly could be made with much effort and time on the part of the supplier, for the process to be economically practical and commercially viable, it should also offer advantages to the supplier of the molded elements in the sense of an effective and efficient operation.

Accordingly, it is an object of the present invention to provide a most effective and efficient process for preparing a continuous string of molded parts in a form which facilitates its shipment to an assembler as well as the automatic assembly of the parts into a single composite product.

More particularly, it is an object of the present invention to provide an improved and integrated process and apparatus for preparing a wound coil of items which coil in itself facilitates the automatic assembly of parts by the assembler.

It is another object of the present invention to provide a continuous process which requires little supervision during the preparation of such a wound coil of items as well as the apparatus therefor.

It is another object of the present invention to provide a process and apparatus for molding a continuous string or chain of molded items without necessarily using a substantial amount of resin for scrap runners or connectors.

It is still another object of the present invention to provide a process and apparatus for molding a continuous string of discreet items whereby the advance of the string and withdrawal of the molded items from the mold are achieved without grabbing and distorting the parts.

Another object of the invention is to enable a continuous string of items to be wound-up without being excessively tensioned.

SUMMARY OF THE INVENTION

These objects are achieved by the present invention in which a continuous element, such as a molded string of items, is advanced toward a winder. The winder is intermittently rotated to wind-up the element. During periods when the winder is stopped, slack is removed from the element by engaging a tensioning member against the element and biasing the tensioning member to displace the latter in a first direction. Following a given extent of travel of the tensioning member in the first direction, the winder is activated to wind-up the element, and the biasing force on the tensioning member is reduced during the wind-up sequence. After the winding-up has been completed, the biasing force is increased so that the tensioning member takes-up slack while acted upon by the increased biasing force.

THE DRAWINGS

The objects and advantages of the invention will become apparent from the following detailed description of a preferred embodiment thereof, in connection with the accompanying drawings in which like numerals designate like elements, and in which:

FIG. 2 is a sectional fragmentary view showing the advancing means of the indexing mechanism in its lowermost position;

FIG. 3 is a sectional fragmentary view showing the advancing means of the indexing mechanism at its uppermost position;

FIG. 5 is a plan view showing the trailing end of a molded connector of a previously molded item and the leading end of a molded connector of a last molded item in a preferred embodiment of the invention;

FIG. 6 is a view of a tensioning device in a preferred embodiment of the present invention;

FIG. 7 shows a side view of the tensioning device of FIG. 6; and

FIG. 8 is a schematic representation of a pneumatic and electric system for operating the tensioning device.

DETAILED DESCRIPTION OF THE INVENTION

Figure 1:
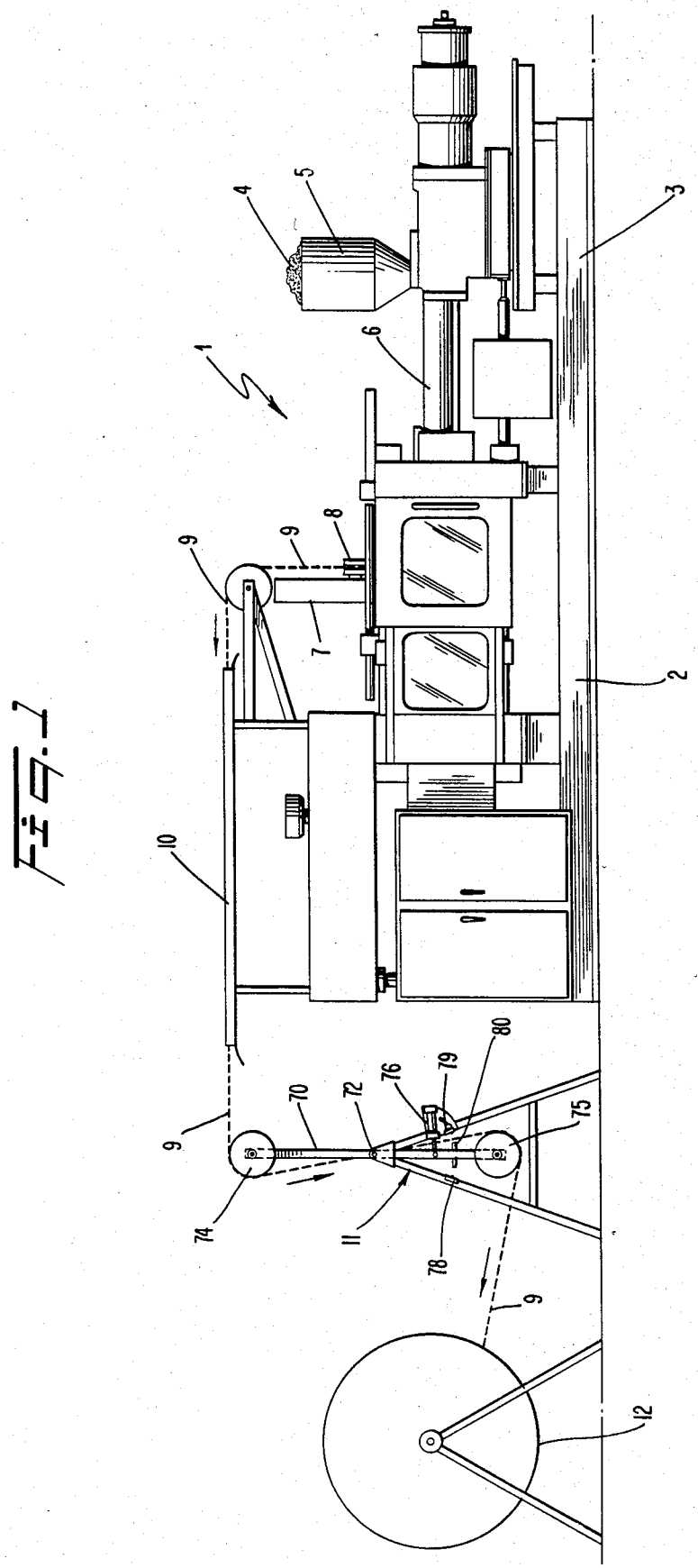
FIG. 1 is a perspective view of the apparatus set-up for the overall integrated process in a preferred embodiment of the present invention.

Referring to FIG. 1, depicted generally as 1 is a commercial injection molding machine, such as that available from Cincinnati Milacron, Van Dorn, HPM or Natco. The molding machine generally comprises a clamp end 2 and an injection end 3. In the conventional manner, resin material 4 is added to the injection end of the machine via hopper 5.

In the general automated and integrated system depicted in FIG. 1, the sequence of steps of practicing the present invention is generally as follows:

The press of the clamp end closes to define the mold cavity into which the molten resin material 4 will be injected. Once the pressure has built-up to the desired amount in the injection section 3 of the machine, which pressure can be measured by a suitable means such as a microswitch, injection takes place via passageway 6, which contains an auger screw to fill the mold cavity with the molten resin material. Injection continues until the cavity is filled, which can be measured by, e.g., a transducer in the mold. About this time, an advancing means 8 of indexing mechanism 7, which is at its top most position, opens its jaws and indexes down until it arrives at its lowermost position, at which time it closes its jaws around the existing strip 9 of molded items. The FIG. 1 shows the advancing means 8 at its lowermost position. The closing of the jaws of the advancing means 8 can be actuated by any suitable means, for example, upon hitting a microswitch when it reaches its lowermost position.

The amount of time appropriate for cooling the injected resin material is then measured, at the conclusion of which the press may be opened. Upon the opening of the press, a conventional ejector mechanism (not shown) is activated and moves forward in order to insure ejection of the molded items from the mold cavities. It is preferred that the indexing mechanism 7 (FIGS. 2 and 3) also move forward with the ejector mechanism in order to assure that the string of articles will hang freely once the ejector retracts. Generally, the ejector and indexing mechanism are moved forward until a forward microswitch is activated causing the ejector to return to its original position but leaving the indexing mechanism forward. This insures that the string of items 9 is hanging freely and thus may be indexed upward without complication.

The advancing means 8 of indexing mechanism 7 then indexes to its uppermost position pulling with it the newly molded item, which has become integral with the already existing string of items 9. As a result, of the upward indexing of the advancing means 8, the string of items 9 is advanced the distance the advancing means 8 travels.

The continuous string of items passes through a guide trough 10 (FIG. 1), which fits over the clamp portion 2 of the injection molding machine 1, and then through a tensioning device 11 and to a wind-up device 12. The tensioning device 11 is synchronized to act simultaneously with the advancement of the string of molded items due to the upward index of the advancing means 8 of the indexing mechanism 7. The tensioning device 11 takes-up the string of parts as advanced and thereby maintains the tension on the entire continuous string 9. The winding device 12 at this time can coil the continuous string of items under the tension provided by the tensioning device 11, or can be designed to wait until some subsequent advancement of the string of items takes place. Importantly, however, the winding operation takes place under tension so that a coil is achieved which thereby substantially precludes sagging and/or entanglement of the molded items during the winding and unwinding of the coil.

The press of the clamping section 2 of the injection molding machine can then close to begin the entire sequence over again. The closing of the press can be actuated by a microswitch which is tripped by the advancing means 8 upon its reaching its uppermost position.

Figure 4:
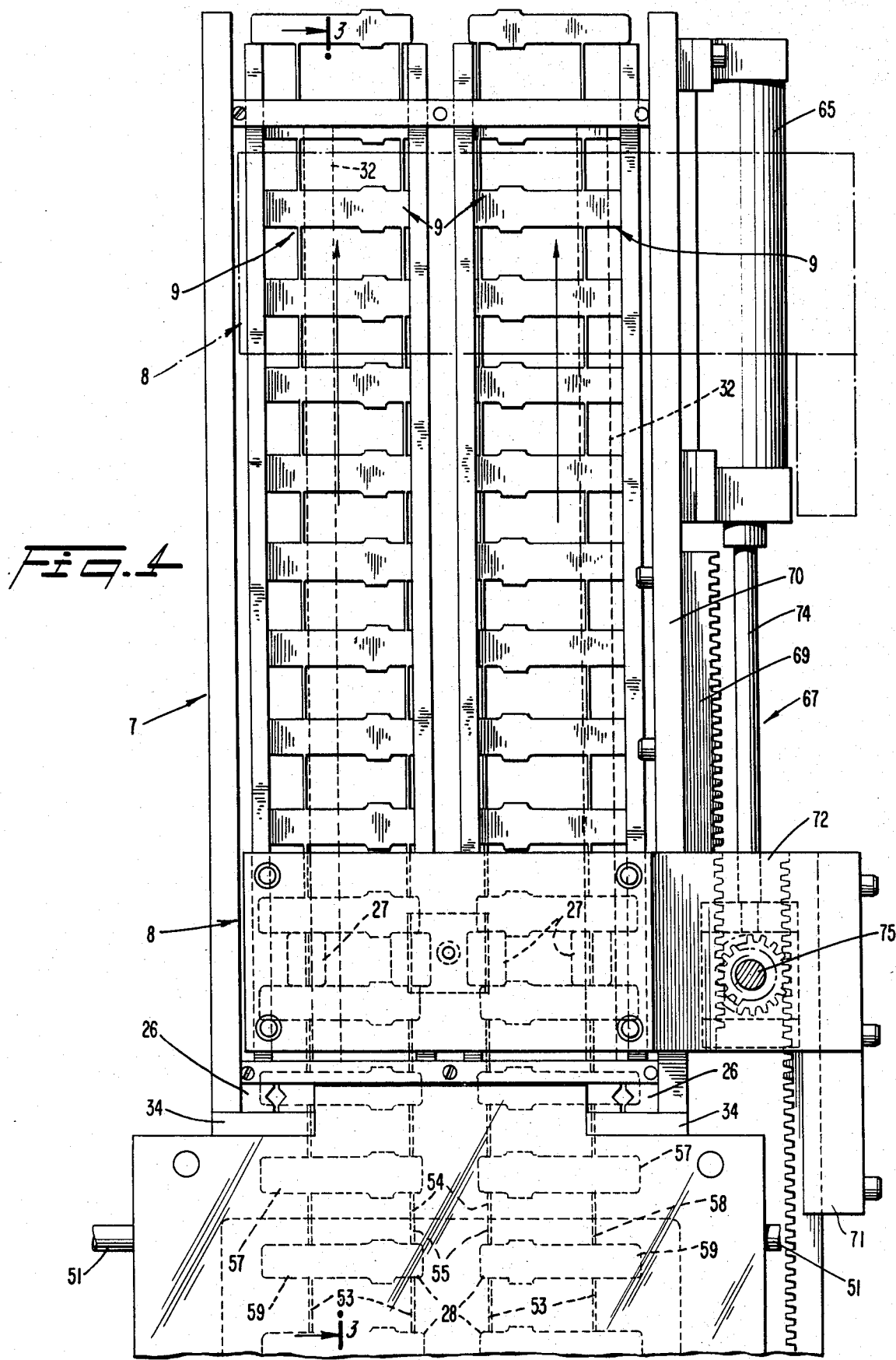
FIG. 4 is a frontal cross-sectional view of the indexing mechanism.

Referring now to FIG. 2, one type of indexing mechanism suitable for the purposes of the present invention will be described in more detail. In FIG. 2, advancing means 8 of the indexing mechanism 7, is at its lowermost position, resting on adjustable stop 24. Two portions or jaws 22, 23 of the advancing means are closed. The continuous string 9 of molded items is therefore securely bound by the advancing means of the indexing mechanism. The string of items 9 can be a single string, or a double string. It is generally preferred to mold a double string of items (as shown in FIG. 4), in order that a larger volume of articles or elements are manufactured in a shorter period of time. In either case, the particular indexing mechanism employed should be made suitable to handle either the single or double string of items. The term "item", as used to describe that which is molded, can comprise but a single article or element, or a plurality of articles or elements connected via molded connectors, and which plurality of articles or elements may be the same or different.

The press 25 of the injection molding machine is shown closed in FIG. 2, thereby defining the mold cavities 28. Once the molding operation is complete, the press opens and a conventional ejector plate 29 moves forward on bars 30. The movement of the plate 29 forward also moves ejector pins 31 forward, which protrude into the mold cavities to eject the newly molded item from the mold cavities 28.

Connected to the ejector plate is a push block 31, the top portion of which 32 abuts the indexing mechanism 7. Thus, when the plate 29 moves forward, the push block 31 pushes the indexing mechanism forward as well. The indexing mechanism moves on micro slides 26, upon which the indexing mechanism is securely mounted, and which are able to slide along tracks (not shown) in block 34. The block 34 remains stationary and is secured to the clamp portion of the molding machine.

The indexing mechanism is locked into its forward or aft positions by a lock detent 35, which fits into detents 36, 37. The lock detent 35 can comprise a ball bearing biased by a spring, for example, so that it snaps into either detent 36 or 37. When the indexing mechanism is in its aft position, the lock detent 35 is secured in detent 36. Upon pressure being applied by push block 31, the indexing mechanism 7 moves forward to its forward position where the lock detent 35 engages detent 37.

Once the ejector plate 29 returns to its original position, the indexing mechanism 7 remains locked forward by means of its lock detent 35 engagement with detent 37. The advancing means 8, then supports the string of molded items 9.

The advancing means 8 shown in FIG. 2 supports the string of items via a block 27, which is inserted behind a rearwardly facing edge 47 of item 39. The block 27 fits in the spacing between two consecutive molded items or elements thereof 39, 40. This block is on the outer jaw 22 of the advancing means 8. In this manner, the indexing mechanism may support and withdraw the newly molded item from the mold without actually grabbing and thereby distorting any of the molded items. Of course, other means for latching onto the string of items in order to advance same, can be employed if so desired. However, the shown indexing mechanism and manner is that preferred.

The advancing means 8 of the indexing mechanism 7 then indexes to its uppermost position, the position shown in FIG. 3, resulting in the advancement of the entire string of molded items 9. The advancing means 8 can move on bars 32, which are mounted to a top and bottom plate of the indexing mechanism structure.

An adjustable stop 42, which may be mounted on the advancing means or index mechanism structure, can be used to assure the advancing means indexes the proper distance and to fine tune the distance when needed. Upon advancing to the uppermost position, the advancing means can also trip a microswitch 44 which activates the closing of the press to restart the cycle.

Once the press 25 again closes, the indexing mechanism 7 is returned to its aft position. A push block 46 mounted on the press applies pressure to the indexing mechanism upon the closing of the press so that it returns to its aft position where detent stop 35 engages detent 36. The advancing means of the indexing mechanism is then activated to separate its jaws 22, 23 in order to release the string of articles as shown in FIG. 3. In the indexing mechanism of FIG. 3, only one jaw, i.e., jaw 22, moves in the opening of the advancing means 8, while the other jaw 23 remains stationary. The opening and closing of the advancing means, i.e., the movement of jaw 22, is controlled by a hydraulic cylinder 43 or some other suitable means. The hydraulic cylinder has a contractable and expandable rod 45 which is connected to the movable jaw 22. The movable jaw 22 may also ride on other stationary rods 47, mounted in stationary jaw 23, for added support. Since the block 27 is miunted on the jaw 22, the continuous string of molded items is released once the jaw 22 is moved to the open position.

As mentioned previously, the advancing means 8 of the indexing mechanism 7 can move on rods 32, with the movement being controlled by a hydraulic cylinder (FIG. 4). Movement along the rods can be via ball bearing guide bushings 49 to which the section 23 is connected, or the movement can be achieved through some other conventional type system.

In FIG. 4 there is depicted a frontal view of the indexing mechanism 7 in relation to the mold cavities 28, where the advancing means 8 is in its lowermost position.

In the molding operation, conduits 51 supply the molten resin injected into the mold cavities 28. The gates for the mold cavities are preferably in the connectors 53 as opposed to the elements, although if desired, the gates may also be in the mold cavities for the elements. It is preferred that two strings of items, with each molded item comprising a plurality of elements, be molded at a time as depicted in FIG. 4, for reasons of high volume. Of course, the process of the present invention can be similarly adapted for the molding of a single string of items, with each molded item comprising a plurality of articles or elements or but a single element or article.

The items molded are molded in spaced relationship to one another and are connected through molded connectors 58. When the item comprises a plurality of elements, these elements are also molded in spaced relationship and connected through molded connectors 53. One or more molded connectors may be used, with two, as shown in FIG. 4, generally being preferred for purposes of stability. It is preferred, however, that the molded connectors be as small as possible in order to limit the amount of scrap moldings that must be dealt with. By employing the particular afore-described indexing mechanism, only very small molded connectors need be used for they only play a role of providing a connection from one item or element thereof to the other, and do not fulfill the role of also providing a means by which the continuous string of items are to be latched onto and advanced. The block or blocks 27 of the indexing mechanism are simply inserted behind the rearwardly facing edge 47 of an item or element thereof, thereby fitting in the spaces between two successive items or elements thereof, and does not require a grabbing of the runner or the article itself.

Upon advancing the newly molded item from the mold by the advancing means 8, the item is only advanced to a position such that the trailing ends 54 of the trailing connectors connected to the last molded item extends into the mold cavity. The leading ends 55 of connectors of the next molded item will then be molded to the trailing ends 54. If the items being molded comprise a plurality of elements as shown in FIG. 4, the trailing connectors can be integral with the last element 57 of the previously molded item, which extend into the mold cavity. The leading ends of the connectors of the foremost element 59 of the item to be molded will then be molded to the trailing ends 54. Upon the subsequent molding operation, therefore, the newly molded item, whether of a single element or plurality of elements, is fused and becomes integral to the already existing string of items.

If desired, the last molded item or the last element 57 thereof can fit into a piloting cavity. The use of a piloting cavity would provide greater assurance of having the trailing connectors 54 be properly oriented and in position to extend into the avities of the leading connectors 55.

It is preferred that the leading ends 55 and trailing ends 54 of the connectors be molded so that a mechanical interlock may also be realized upon a joining of same. This would provide an additional safeguard in the chance that the fusion between the connectors was not complete. The nature of the mechanical interlock can be of any convenient nature, such as a simple complementary crimp in each of the connectors, a flange type in which one fits into a recess in the other, or that of a mechanical pin. The smaller the molded connectors, however, the less sophisticated the interlock must generally become for practical reasons.

FIG. 5 shows a mechanical interlock where the trailing connector 54 has a diminished end 60 with a hole 61. Thus, when the leading connector 55 is molded, the resin also enters the hole 61 to provide a mechanical pin type of interlock.

Referring again to FIG. 4, once the molding operation has been completed and the newly molded item has been ejected from the mold cavities, the indexing mechanism withdraws the newly molded item from the mold, except for the trailing ends 54. This action results in advancement of the entire continuous string of molded items 9. The advancing by the advancing means 8 of the indexing mechanism 7 is controlled by the hydraulic cylinder 65, with the advancing means moving along the bars 32. A rack and pinion mechanism 67 for achieving the movement of the advancing means 8 is shown in FIG. 4.

The left rack 69, which is stationary, is mounted to the side panel 70 of indexing mechanism 7. The movable rack 71 is mounted to a back panel 72 of the advancing means 8, so that the rack 71 moves up and down with the advancing means. Also secured to the back panel 72 is the rod 74 of the hydraulic cylinder 65. Thus, as the rod contracts and expands, the advancing means 8 and rack 71 move up and down. Pinion 75 is meshed with racks 69 and 71.

The continuous string of items, prior to being wound in a coil, passes through the tensioning device 11 which maintains a constant tension on the string and thereby allows for the string to be wound in a coil under tension to substantially preclude problems caused by a sagging of the coil and entanglement of the items. While any suitable tensioning device may be employed, a preferred tensioning device (FIG. 6) comprises a bar 70, preferably vertical, which is free to rotate around an axis 71 disposed perpendicular to the bar. This may be achieved, for example, by connecting a rotatable rod 72 to the middle of the bar 7. At the top of the vertical bar 70 are mounted pulleys or guides 74 through which the continuous string of items pass. At the bottom of the bar are mounted additional guides 75 through which the continuous string of articles pass onto the winding device. In FIG. 6, two sets of guides 74 and 75 are shown, thereby making the tensioning device appropriate for use for two continuous strings of molded items. Any other suitable means for supporting the vertical bar may be used.

In FIG. 7, it is seen that the continuous string of items passes over the topmost guide 74 and then under the bottom guide 75 in a serpentine or S-wrap manner. The vertical bar 70 is biased by an air cylinder 76 or other suitable means, e.g., a spring, so that the top portion of the bar 70 moves generally in the direction of the advancement of the continuous string of items and the bottom portion moves generally away from the direction of advancement, i.e., the top of the vertical bar moving to the left and the bottom of the vertical bar moving to the right in FIG. 7. Thus, the tensioning means is synchronized with the molding and indexing operations in the sense that whenever the continuous string of articles is advanced by the advancing means, the vertical bar 70 of the tensioning means 11 moves correspondingly to pick-up the added length in the string 9 created by the advancement of the items, thereby maintaining a constant tension on the continuous string 9. In other words, the top of the vertical bar would move to the left, in the direction in which it is biased by the air cylinder 76, simultaneously with the advancement of the continuous string of items due to the indexing operation.

If desired, the winding device 12, which is run intermittently and to which the string of articles 9 proceeds, can be activated after every indexing operation to thereby coil the string of items under tension. The winding device need not occur, however, with every advancing or indexing operation, but can occur only after a designated number of indexing operations, e.g., after the 4th, 5th or 6th indexing operation. In such an instance, the tensioning device picks up the added length created by the added items and maintains a constant tension thereon until a winding operation occurs. It is preferred that the winding operation in such instances be activated and deactivated by microswitches or some other type of sensing means which can be tripped by the vertical bar 70 of the tensioning device as it moves.

In FIG. 7, microswitches 78 and 79 depict such actuation means in the operation of such a system. The upper portion of bar 70 moves to the left during every indexing or advancing operation in order to maintain a constant tension on the continuous string of molded items. Of course, as the top of the vertical bar is moving to the left, the bottom is moving to the right. After a predetermined number of advancing operations, the microswitch 79 is tripped, for example, by a stud 80 located on the bar 70. The tripping of the microswitch activates the winding device which begins coiling the string of items under tension. The coiling of the articles causes the tensioning device to return to its original or neutral position whereupon the wood stud 80 trips the microswitch 78 to deactivate the winding device. The cycle is then again repeated with the upper portion of the vertical bar moving in the direction of the advancement of the continuous coil of items in order to maintain a constant tension on the string of items. The movement of the bar continues in the direction of the advancement until the microswitch 79 is again tripped, activating the winding operation. The exact number of advancing or indexing operations taken up by the tensioning device prior to the activation of the winding operation can be predetermined by the distance created between microswitches 78 and 79.

The air cylinder 76 is a preferred biasing means as its bias can be easily regulated and altered as needed. For example, the air pressure of the cylinder can be about 15 p.s.i. when the winding operation is not occurring, and only about 5 p.s.i. when the winding operation is activated. Since the winding operation will generally be activated during an advancing operation due to the difficulty in achieving a predetermined distance between microswitches 78 and 79 which corresponds exactly to a certain number of advancing operations, conflicting forces will be exerted on the string of items by the winding operation and movement of the bottom portion 75 of the bar 70. The lesser bias, i.e., 5 p.s.i., will lessen the strain and hence the possibility of breakage of the string of items. Of course, the molding connectors can be made larger and strong enough to withstand any possible strain, in which instance the bias or tension of the tensioning device 11 need not be altered. In such instances, a static bias may be applied.

A system for achieving a variable bias on the air cylinder 76 is depicted in FIG. 8. That system includes a source of pressurized air 100 which can include a power driven pump. The air source 100 communicates in parallel with first and second electrically actuated solenoids 102, 104. The first solenoid 102 is electrically coupled to the microswitch 78 and the second microswitch is electrically coupled to the microswitch 79. The first and second solenoids communicate with first and second air pressure regulators 106, 108, respectively, which can be of any suitable type, such as that marketed by Arrow Corp. under Model No. 1611A-18REGCD. The outlets of the pressure regulators 106, 108 communicate with a common air line 110 which feeds pressurized air to the rod side of the air cylinder 76. The piston side of the cylinder is open to atmosphere by way of a needle valve (not shown).

The first pressure regulator 106 is preferably set to supply air at a pressure of about 15 p.s.i., and the second pressure regulator 108 is preferably set to supply air at a pressure of about 5 p.s.i.

In practice, when a wind-up sequence terminates as a result of the stud 80 tripping the microswitch 78, the first solenoid 102 is activated and the second solenoid 104 is deactivated. Accordingly, the higher pressure air (15 p.s.i.), in lieu of lower pressure air (5 p.s.i.), is supplied to the rod side of the air cylinder 76. The subsequent molding and advancement of new items from the mold results in the bar 70 rotating (counterclockwise in FIG. 7) under the higher pressure to take-up any slack which would otherwise occur in the string of items 9. When a new wind-up sequence is started as a result of the stud 80 tripping the microswitch 79, the first solenoid 102 is deactivated and the second solenoid 104 is actuated. Thus, during the wind-up sequence, the air cylinder 76 is subjected to the lower pressure (5 p.s.i.). This assures that the string of items 9 will not be broken, especially at the instant when the winder first tensions the string and most especially when the winder 12 is relatively filled since the wind-up forces imposed on the string are relatively large (i.e., larger diameter of the wound-up string on the winder results in a larger moment arm). It generally occurs that the winder is activated during movement of the bar 70, thereby resulting in the imposition of added tension on the string which is being positively forced in opposite directions. By reducing the bias imposed upon the air cylinder, the amount of stress is accordingly reduced.

With regard to the winding operation, it has also been found most desirable that a clutch and brake mechanism be employed. Hence, the motor of the winding device runs continuously, but the clutch or brake is engaged during the activation or deactivation of the winding operation respectively.

Thus, it can be readily seen that the winding, the tensioning, the advancing or indexing and the molding operations are all integrated and synchronized in order to allow for a continuous operation of the molding machine while maintaining a constant tension upon the continuous molded string of articles to thereby result in a winding of the string of items under tension. The integration and synchronization of the overall process as described by reference to the drawings exemplifies such a process which allows the molding and winding of a tightly coiled string of items to continue with little supervision, thereby making the process extremely attractive to the molding operators. The only supervision necessary once the process has been initiated is that normally required to check that the molding machine and the rest of the equipment is working properly.

Moreover, once a spool upon which the continuous string of articles is being wound is completely filled, by readying another spool on a carriage on wheels, the fully coiled spool can be readily replaced with an empty spool with very little down time, if any. As well, the system can be operated to achieve several adjacent coils of items on a single spool, if desired.

The tightly wound coil of articles if of considerable value and advantage to the assembler. Due to the winding of the coil under the constant tension, little or no entanglement or sagging of the coil occurs. The need for constant monitoring and the disadvantages of having to constantly shut down the operation due to the sagging of the coil or in order to untangle the coil is thereby avoided. As well, the coil allows the assembler to automatically feed the elements to the assembly machinery instead of having to hand orient and feed individual parts or strips of parts.

The process and apparatus of the present invention, therefore, provide not only a continuous string of molded items in a form which is extremely advantageous for the assembler, but also a method which is extremely advantageous to the molding operator in the efficient, continuous and integrated operation of the system. The advantages of the process and apparatus of the present invention can be realized in applying same to any part or item which can be coiled and which would be eventually fed to an assembly machine on a continuous basis. Particular applicability would be found in molding parts for the electronics, communications, appliance and consumer products industries, where a requirement for small molded parts linked together for automatic assembly exists.

While the present invention has been described in terms of molding elements which will be later assembled to form a final product, it is readily seen that the present invention can be also employed for molding any article per se where a need for a continuous chain or string of said articles in a coiled form exists.

Although the invention has been described with preferred embodiments, it is to be understood that variations and modifications may be resorted to as will become apparent to those skilled in the art. Such variations and modifications are to be considered within the purview and scope of the claims appended hereto.

What is claimed is:

1. In a process for winding-up a continuous element which is being advanced toward a winder, the process including the steps of intermittently winding the element and taking-up slack in the element in between the winding sequences, said process comprising the steps of:
    taking-up slack in the element which would otherwise occur when the element is advanced and the winder is stopped, by:
        engaging a tensioning member against the element,
        biasing the tensioning member with a biasing force in a first direction for taking-up slack, so that the tensioning member is displaced by the biasing force when the element is advanced,
    actuating rotation of the winder to initiate a wind-up sequence following a given extent of travel of the tensioning member in the first direction while the tensioning member yieldably opposes the winding of the element with a biasing force of a first strength, and
    deactivating the winder after a given extent of travel of the tensioning member in a second direction opposite the first direction and increasing the strength of the biasing force to a second strength so that the tensioning member takes-up subsequent slack in the element under the increased second strength.

2. A process according to claim 1 including the steps of sensing the arrival of the tensioning member at a predetermined first location in the first direction of travel, and activating the winder when the tensioning member reaches that first location, and sensing the arrival of the tensioning member at a predetermined second location in the second direction of travel and deactivating the winder when the tensioning member reaches that second location.

3. A process according to claim 2 including the steps of biasing the tensioning member in the first and second directions by a fluid actuated motor, increasing the fluid pressure acting on the motor when the tensioning member reaches the second location, and lowering the fluid pressure acting on the motor when the tensioning member reaches the second location.

4. A process according to claim 1, wherein said continuous element comprises a string of molded items.

5. Apparatus for winding-up a continuous element which is being advanced along a path of travel, comprising:
    a rotary winder upon which the element is to be wound,
    means for intermittently rotating said winder to intermittently wind-up the element,
    tensioning means for taking-up slack in the element which would otherwise occur when the element is advanced and the winder is stopped, said tensioning means comprising:
        a movable tensioning member engageable with the element,
        biasing means for biasing the tensioning member with a biasing force in a first direction for taking-up slack, such that the tensioning member is displaced by the biasing force when the element is advanced,
    drive means for rotating the winder to wind-up the element following a given extent of travel of the tensioning member in the first direction,
    means for effecting a reduced magnitude of the biasing force during rotation of the winder to reduce the tension applied to the element,
    means for stopping the rotation of the winder following a given extent of travel of the tensioning member in a second direction opposite the first direction, and
    means for increasing the magnitude of the biasing force with the winder in a stopped condition.

6. Apparatus according to claim 5 including first sensing means for sensing the arrival of the tensioning member at a predetermined first location in the first direction of travel, the first sensing means being connected to the drive means to activate the latter for rotating the winder and connected to the means for reducing the biasing force, second sensing means for sensing the arrival of the tensioning member at a predetermined second location in the second direction of travel, the second sensing means being connected to the drive means to deactivate the latter for stopping rotation of the winder, and connected to the means for increasing the magnitude of the biasing force.

7. Apparatus according to claim 6, wherein said biasing means comprises a fluid-driven motor, said means for reducing the biasing force comprising a first pressure regulator, and said means for increasing the biasing force comprising a second pressure regulator.

8. Apparatus according to claim 5, wherein the continuous element comprises a string of molded items.

* * * * *